US012789881B2

(12) United States Patent
Dai

(10) Patent No.: US 12,789,881 B2
(45) Date of Patent: Nov. 10, 2026

(54) ADJUSTABLE STEERING WHEEL FOR LOW-SPEED ELECTRIC VEHICLE

(71) Applicant: Xiamen Dalle New Energy Automobile Co., Ltd, Xiamen City (CN)

(72) Inventor: Side Dai, Xiamen City (CN)

(73) Assignee: Xiamen Dalle New Energy Automobile Co., Ltd, Xiamen (CN)

( * ) Notice: Subject to any disclaimer, the term of this patent is extended or adjusted under 35 U.S.C. 154(b) by 0 days.

(21) Appl. No.: 18/659,437

(22) Filed: May 9, 2024

(65) Prior Publication Data

US 2025/0304146 A1 Oct. 2, 2025

(30) Foreign Application Priority Data

Mar. 29, 2024 (CN) ......................... 202420638036.1

(51) Int. Cl.
*B62D 1/187* (2006.01)
*B62D 1/184* (2006.01)

(52) U.S. Cl.
CPC ............. *B62D 1/187* (2013.01); *B62D 1/184* (2013.01)

(58) Field of Classification Search
CPC ................................ B62D 1/187; B62D 1/184
See application file for complete search history.

(56) References Cited

U.S. PATENT DOCUMENTS

| | | | | |
|---|---|---|---|---|
| 4,179,137 | A * | 12/1979 | Burke | B62D 1/184<br>280/775 |
| 4,494,773 | A * | 1/1985 | Fukui | B62D 1/187<br>280/775 |
| 5,088,342 | A * | 2/1992 | Bening | B62D 1/184<br>280/775 |
| 8,726,757 | B2 * | 5/2014 | Barroso | B62D 1/183<br>74/493 |
| 8,899,129 | B2 * | 12/2014 | Isaka | B62D 1/183<br>280/775 |
| 9,669,861 | B2 * | 6/2017 | Sedlmeier | B62D 1/187 |
| 2020/0255049 | A1 * | 8/2020 | Okutani | B62D 1/184 |

* cited by examiner

*Primary Examiner* — Jason D Shanske
*Assistant Examiner* — Joselynn Y Sliteris

(57) ABSTRACT

An adjustable steering wheel for a low-speed electric vehicle, including a steering wheel and a steering column. An upper end of the steering column is connected to the steering wheel, and the steering column is arranged with an adjustment device for adjusting an angle of the steering column to adjust an angle of the steering wheel. The adjustment device includes a fixing seat, a rotating plate rotatably connected to the fixing seat, and an adjusting mechanism for driving the rotating plate to drive the steering column to rotate. A lower end of the steering column passes through the rotating plate, and an end of the fixing seat abuts against a frame of the low-speed electric vehicle.

8 Claims, 4 Drawing Sheets

ADJUSTABLE STEERING WHEEL FOR LOW-SPEED ELECTRIC VEHICLE

CROSS REFERENCE

The present disclosure claims priority of Chinese Patent Application No. 2024206380361 filed on Mar. 29, 2024, the entire contents of which are hereby incorporated by reference in their entirety.

TECHNICAL FIELD

The present disclosure relates to the technical field of electric vehicles, and more specifically to an adjustable steering wheel for a low-speed electric vehicle.

BACKGROUND

Low-speed electric vehicles have various types, and correspondingly have various functions. Currently, electric cars in China are mainly used for sightseeing passengers, security patrols, handling of goods, etc. The main purpose of the electric sightseeing car is applied as a passenger carrier in parks, scenic spots, recreational resorts, universities, hospitals, golf courses, real estate companies, etc. The main purpose of the electric patrol car is applied to carry out security patrols in the station square and other crowded places. With the growing development of the electric vehicle industry, users have higher and higher performance requirements on the electric vehicles as mobility tools and auxiliary tools. In the driving process, a driver of a vehicle controls its steering wheel, such that the vehicle maintains or changes the movement direction in accordance with the driver's intention. Currently, the steering wheel device and system have many problems. For example, when there is a big difference in height of several people driving the same vehicle, the height of the steering wheel is not easy to be adjusted to suit different height requirements, which greatly affects the comfort performance of the user when using the electric vehicle, causing great inconvenience to some users.

SUMMARY OF THE DISCLOSURE

The main purpose of the present disclosure is to provide an adjustable steering wheel for a low-speed electric vehicle in order to solve the above problems raised in the related art.

Compared to the related art, the beneficial effect of the present disclosure is that: an adjustable steering wheel for a low-speed electric vehicle, including a steering wheel and a steering column; wherein an upper end of the steering column is connected to the steering wheel, and the steering column is arranged with an adjustment device for adjusting an angle of the steering column to adjust an angle of the steering wheel; the adjustment device includes a fixing seat, a rotating plate rotatably connected to the fixing seat, and an adjusting mechanism for driving the rotating plate to drive the steering column to rotate; a lower end of the steering column passes through the rotating plate, and an end of the fixing seat abuts against a frame of the low-speed electric vehicle.

In some embodiments, the adjusting mechanism includes an adjusting rod and a pressure rod; an end of the pressure rod is connected to the adjusting rod, and the other end of the pressure rod abuts against another end of the fixing seat.

In some embodiments, the rotating plate is arranged with a rotating shaft; the fixing seat defines a track slot to cooperate with the rotating shaft, and the rotating shaft passes through the track slot; the track slot is configured to provide a movement track when the rotating plate rotates.

In some embodiments, the track slot is an arcuate slot.

In some embodiments, the track slot is arranged with a locking mechanism for restricting a movement of the rotating shaft.

In some embodiments, the locking mechanism includes a locking slot defined on a side of the rotating shaft in contact with the track slot, and a locking block arranged on a side of the track slot in contact with the rotating shaft; the locking block is matched with the locking slot.

In some embodiments, the other end of the fixing seat is arranged with a fixing rod docked with the pressure rod.

In some embodiments, the adjusting mechanism further includes a limit block; upper and lower surfaces of the adjusting rod define an upper adjusting slide slot and a lower adjusting slide slot that are staggered and misaligned from each other; the limit block defines a through slot, a height of the through slot being greater than a thickness of the adjusting rod; the adjusting rod passes through the limit block to cooperate with the limit block through the upper adjusting slide slot; the pressure rod is movably clamped within the lower adjusting slide slot.

Compared with the related art, the beneficial effect of the present disclosure is that: the present disclosure proposes a simple structure, where the angle of the steering column can be adjusted by the adjusting device, such that the height of the steering wheel can be adjusted according to the driver's height and fatness, which is suitable for all kinds of drivers of various heights and body shapes to drive comfortably, and applicable and comfortable to drive.

DETAILED DESCRIPTION

The technical solutions in the embodiments of the present disclosure will be described clearly and completely in the following in conjunction with the accompanying drawings in the embodiments of the present disclosure, and it is obvious that the described embodiments are only a part of the embodiments of the present disclosure and not all of the embodiments. Based on the embodiments in the present disclosure, all other embodiments obtained by those skilled in the art without making creative labor fall within the scope of the present disclosure.

Figure 1:
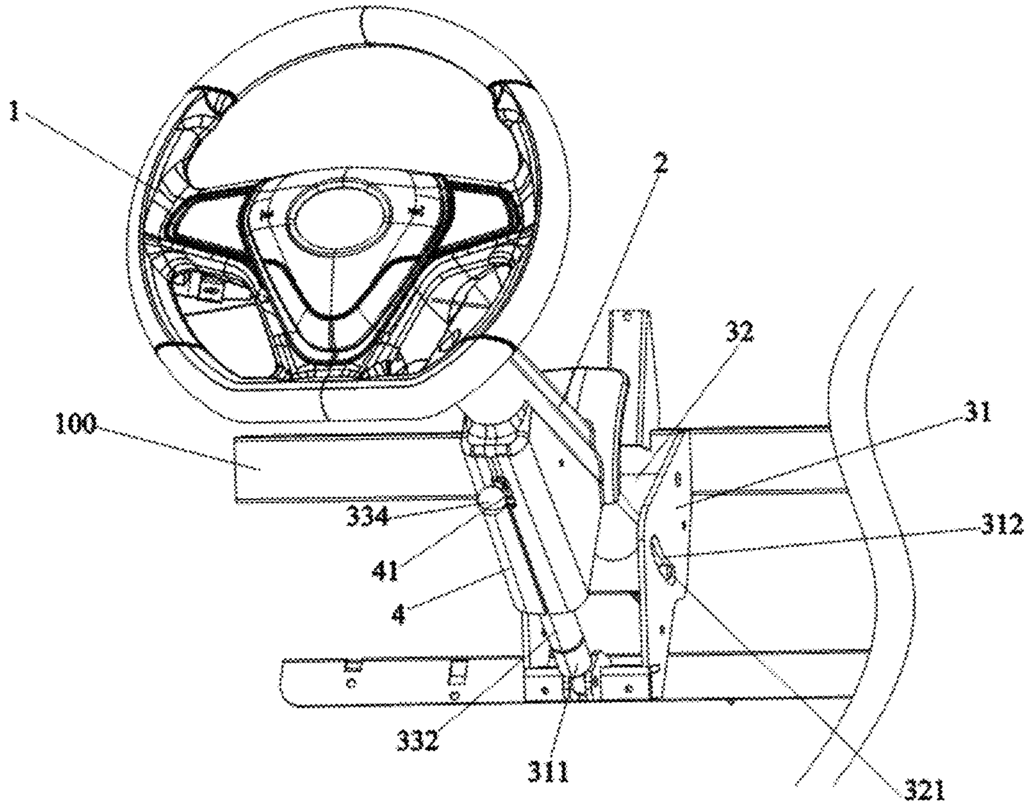
FIG. 1 is a structural schematic view of an adjustable steering wheel for a low-speed electric vehicle according to some embodiments of the present disclosure.
Figure 2:
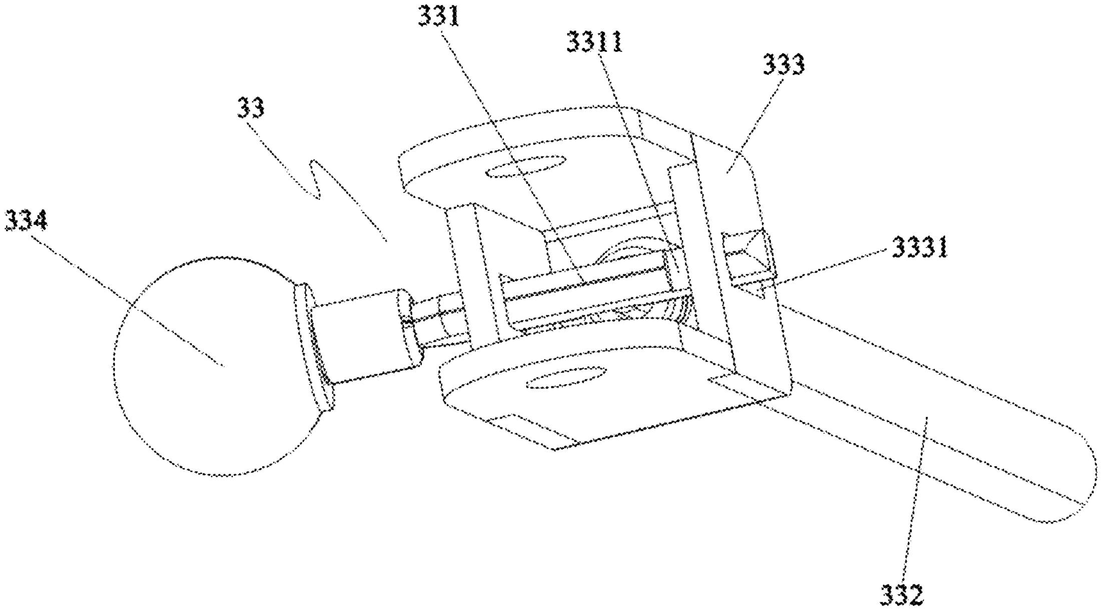
FIG. 2 is a structural schematic view of an adjusting device in an adjustable steering wheel for a low-speed electric vehicle according to some embodiments of the present disclosure at another viewing angle.
Figure 3:
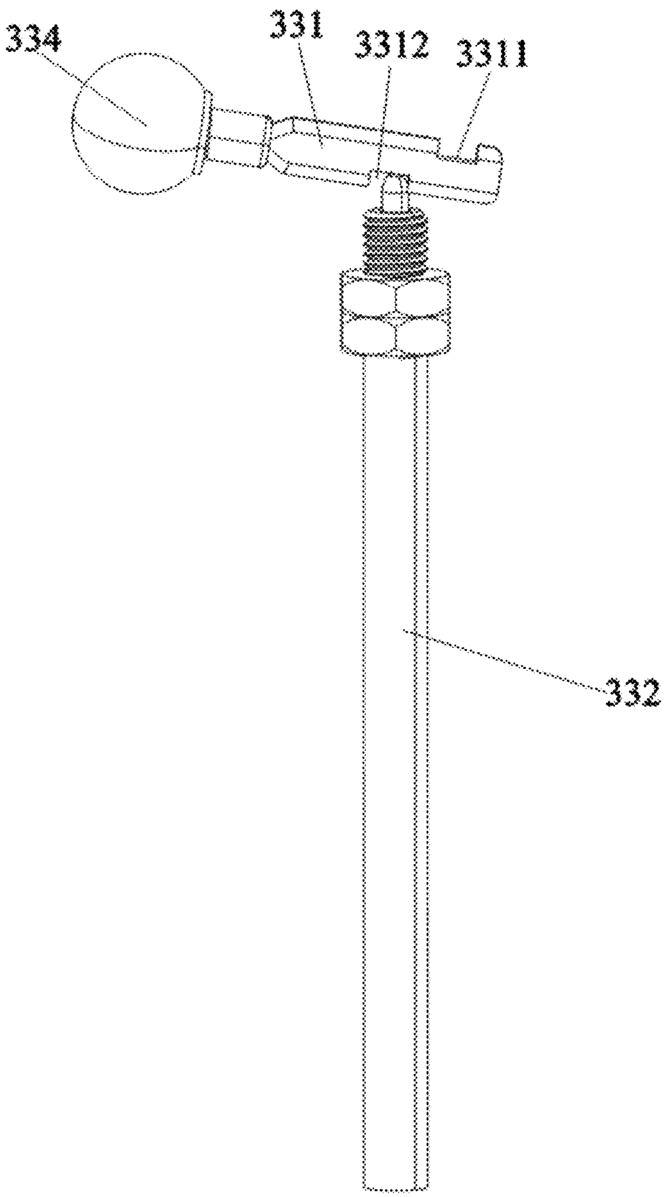
FIG. 3 is an assembled structural schematic view of an adjusting rod and pressure rod in an adjustable steering wheel for a low-speed electric vehicle according to some embodiments of the present disclosure.
Figure 4:
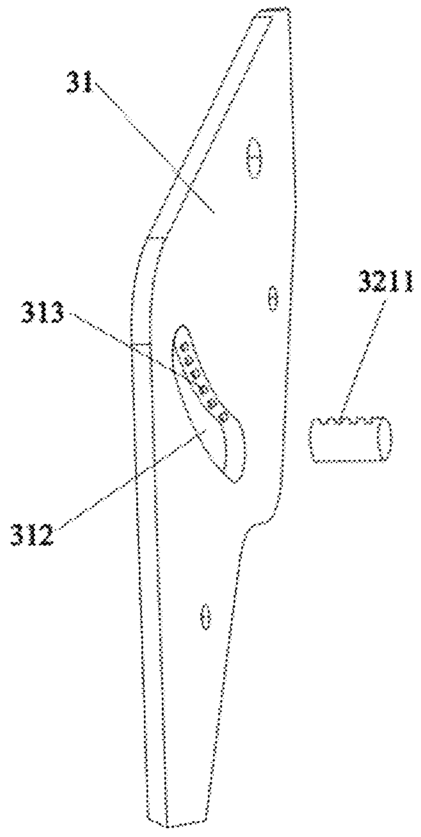
FIG. 4 is a structural schematic view of a locking mechanism in an adjustable steering wheel for a low-speed electric vehicle according to some embodiments of the present disclosure.

As shown in FIGS. 1 to 4, the present embodiments provide an adjustable steering wheel for a low-speed electric vehicle, including a steering wheel 1 and a steering column 2; an upper end of the steering column 2 is connected to the steering wheel 1, and a lower end of the steering column 2 is connected to a turning column; in operation, the driver steers by holding the steering wheel 1 in his/her hand; the steering column 2 is arranged with an adjustment device for adjusting an angle of the steering column 2 to adjust an angle of the steering wheel 1; the adjustment device includes a fixing seat 31, a rotating plate 32 rotatably connected to the fixing seat 31, and an adjusting mechanism 33 for driving the rotating plate 32 to drive the steering column 2 to rotate; and an end of the fixing seat 31 abuts against a frame 100 of the low-speed electric vehicle.

The adjusting mechanism 33 includes an adjusting rod 331, a pressure rod 332, and a limit block 333; the adjusting rod 331, the pressure rod 332, and the limit block 333 are all received in a hollow shelf body 4; the limit block 333 is fixed to the shelf body 4, and the adjusting rod 331 and the pressure rod 332 are arranged in an interference fit with the shelf body 4; an adjusting handle 334 is arranged on the adjusting rod 331, and the adjusting handle 334 is exposed outside the shelf body 4 and has a transverse adjustment distance with the shelf body 4; the shelf body 4 defines a moving slot 41 configured for the adjusting handle 334 to slide; an end of the pressure rod 332 is connected to the adjusting rod 331; specifically, upper and lower surfaces of the adjusting rod 331 define an upper adjusting slide slot 3311 and a lower adjusting slide slot 3312 that are staggered and misaligned from each other; the limit block 333 defines a through slot 3331, a height of the through slot 3331 being greater than a thickness of the adjusting rod 331, a width of the limit block 333 being less than a width of the upper adjusting slide slot 3311; the adjusting rod 331 passes through the limit block 333 and cooperates with the limit block 333 through the upper adjusting slide slot 3311; the pressure rod 332 is movably clamped within the lower adjusting slide slot 3312 and does not detach from the lower adjusting slide slot 3312; the other end of the pressure rod 332 is capable of pressing against or separating from the other end of the fixing seat 31; when the other end of the pressure rod 332 presses against the other end of the fixing seat 31, the other end of the fixing seat 31 is pressed against the frame 100 of the low-speed electric vehicle; the other end of the fixing seat 31 is arranged with a fixing rod 311 docked with the pressure rod 332.

The rotating plate 32 is a square structure, and the rotating plate 32 is arranged with a rotating shaft 321; the fixing seat 31 defines a track slot 312 to cooperate with the rotating shaft 321, and the rotating shaft 321 passes through the track slot 312; the track slot 312 provides a movement track when the rotating plate 32 is rotating; the track slot 312 is an arcuate slot, and the track slot 312 is arranged with a locking mechanism for restricting the movement of the rotating shaft 321; a locking slot 3211 may be defined on a side of the rotating shaft 321 in contact with the track slot 313, and a locking block 313 is arranged on a side of the track slot 313 in contact with the rotating shaft 321; the locking block 313 is controlled to telescope by a controller.

The present embodiments further provide a low-speed electric vehicle including the above-described adjustable steering wheel for the low-speed electric vehicle. The low-speed electric vehicle includes one or more of a sightseeing car, a golf cart, a fire truck, and a patrol car.

The rotating plate 32 is a square structure, and the rotating plate 32 is arranged with a rotating shaft 321; the fixing seat 31 defines a track slot 312 to cooperate with the rotating shaft 321, and the rotating shaft 321 passes through the track slot 312; the track slot 312 provides a movement track when the rotating plate 32 is rotating; the track slot 312 is an arcuate slot, and the track slot 312 is arranged with a locking mechanism for restricting the movement of the rotating shaft 321; a locking slot 3211 may be defined on a side of the rotating shaft 321 in contact with the track slot 312, and a locking block 313 is arranged on a side of the track slot 312 in contact with the rotating shaft 321; the locking block 313 is controlled to telescope by a controller.

Compared with the related art, the beneficial effect of the present disclosure is that: the present disclosure proposes a simple structure, where the angle of the steering column can be adjusted by the adjusting device, such that the height of the steering wheel can be adjusted according to the driver's height and fatness, which is suitable for all kinds of drivers of various heights and body shapes to drive comfortably, and applicable and comfortable to drive.

Although the present disclosure has been described in detail with reference to the foregoing embodiments, for those skilled in the art, it is still possible to make modifications to the technical solutions recorded in the foregoing embodiments, or make equivalent replacements for some of the technical features therein. Any modifications, equivalent replacements, improvements, etc. made within the spirit and principles of the present disclosure shall be included in the scope of the present disclosure.

What is claimed is:

1. An adjustable steering wheel for a low-speed electric vehicle, comprising a steering wheel and a steering column;

wherein an upper end of the steering column is connected to the steering wheel, and the steering column is arranged with an adjustment device for adjusting an angle of the steering column to adjust an angle of the steering wheel; the adjustment device comprises a fixing seat, a rotating plate rotatably connected to the fixing seat, and an adjusting mechanism for driving the rotating plate to drive the steering column to rotate; and an end of the fixing seat abuts against a frame of the low-speed electric vehicle.

2. The adjustable steering wheel according to claim 1, wherein the adjusting mechanism comprises an adjusting rod and a pressure rod; an end of the pressure rod is connected to the adjusting rod, and an other end of the pressure rod abuts against an other end of the fixing seat.

3. The adjustable steering wheel according to claim 2, wherein the rotating plate is arranged with a rotating shaft; the fixing seat defines a track slot to cooperate with the rotating shaft, and the rotating shaft passes through the track slot; the track slot is configured to provide a movement track when the rotating plate rotates.

4. The adjustable steering wheel according to claim 3, wherein the track slot is an arcuate slot.

5. The adjustable steering wheel according to claim 4, wherein the track slot is arranged with a locking mechanism for restricting a movement of the rotating shaft.

6. The adjustable steering wheel according to claim 5, wherein the locking mechanism comprises a locking slot defined on a side of the rotating shaft in contact with the track slot, and a locking block arranged on a side of the track slot in contact with the rotating shaft; the locking block is matched with the locking slot.

7. The adjustable steering wheel according to claim 2, wherein the other end of the fixing seat is arranged with a fixing rod docked with the pressure rod.

8. The adjustable steering wheel according to claim 2, wherein the adjusting mechanism further comprises a limit block; upper and lower surfaces of the adjusting rod define an upper adjusting slide slot and a lower adjusting slide slot that are staggered and misaligned from each other; the limit block defines a through slot, a height of the through slot being greater than a thickness of the adjusting rod; the adjusting rod passes through the limit block to cooperate with the limit block through the upper adjusting slide slot; the pressure rod is movably clamped within the lower adjusting slide slot.

* * * * *